United States Patent [19]

Vogel

[11] 4,030,215

[45] June 21, 1977

[54] SPORTS SHOES MADE OF PLASTIC

[76] Inventor: Raimund W. Vogel, Lier St. 25, Munich 19 D8, Germany

[22] Filed: Feb. 11, 1974

[21] Appl. No.: 457,632

Related U.S. Application Data

[63] Continuation of Ser. No. 189,846, Oct. 19, 1971, abandoned.

[52] U.S. Cl. .............................................. 36/119
[51] Int. Cl.² ......................................... A43B 5/04
[58] Field of Search ............. 36/2.5 R, 2.5 AL, 50, 36/11.5, 51, 117, 119

[56] References Cited

UNITED STATES PATENTS

| | | | |
|---|---|---|---|
| 2,718,905 | 9/1955 | Moore | 36/51 |
| 3,439,434 | 4/1969 | Tangorra | 36/2.5 AL |
| 3,522,668 | 8/1970 | Fesl | 36/2.5 AL |

FOREIGN PATENTS OR APPLICATIONS 1,542,067  10/1967  France ........................... 36/2.5 AL Primary Examiner—Patrick D. Lawson

[57] ABSTRACT

The specification describes a sports shoe particularly a ski boot which holds the foot free of pain in a fixed manner. The shoe has a good heel fit owing to the use of an instep strap which fixes the foot laterally and the lower leg partly at its front. At the closing border of the upper the shoe is snow-tight and supports the lower leg owing to the provision of elastic parts in the region over the insetp of the shoe and over the heel. These parts have an elasticity which decreases towards the boot sole.

5 Claims, 7 Drawing Figures

SPORTS SHOES MADE OF PLASTIC

This is a continuation of the copending application serial No. 189,846, filed Oct. 19, 1971 now abandoned.

BACKGROUND OF INVENTION

The present invention relates to plastic sport shoes, and more particularly ski boots which are produced by casting.

SUMMARY OF INVENTION

In order for the parts of an upper of a common cast plastic boot to be able to take up tension loading at a position close to a boot's closing border the wall thicknesses are chosen so as to be comparatively large. This leads in a disadvantageous manner to heavy boots or shoes and to stiff uppers so that such shoes may easily give rise to pain when skiing and walking.

It is difficult to construct a plastic shoe, more particularly a ski boot in such a manner that the sides of the upper are stiff and that the upper closing border edge closes the boot in a snow-tight manner in every ankle position of the lower leg in the boot.

The invention overcomes this difficulty as described below.

The invention relates to a plastic boot particularly to a ski boot comprising a boot sole, a boot upper connected with a sole, the upper being stiff at least in the region of the sole and its sides and laterally above the ankle bone region of the upper, these stiff lateral sides form recesses above the heel region at the rearmost part and the instep region of the upper and in that the upper includes a closing border of elastically deformable material having at least two appendages one of which extends from and closes the recess above the heel bone region of the upper and the second of which extends and closes the recess above the instep region of the upper, the closing border and its appendages being more elastically deformable than the remaining portion of the upper and decreasing in elasticity from the uppermost portion of the closing border in the direction of the sole of the boot, whereby the elastically deformable closing border is fixedly connected at the edge of the stiff upper, whereby every change of position between the foot and the lower leg of the skier required in skiing is possible without the elastically deformable closing border of the upper of the boot losing its snow-tight fit in respect to the leg of the skier positioned in the boot.

Owing to this feature it is possible to guide the lower leg laterally stiffly and to make possible movement backwards and forwards aganst the resistance of the elastic deformable parts of the upper of the boot.

Said ski boot in accordance with the invention adapts itself in its elastic deformable parts, while keeping its secure guidance of the lower leg, to every change of the angle between the lower leg and the foot without any pain on the lower leg.

It is advantageous that the elastic regions or parts of said upper have an increasing wall thickness from the closing border to the boot sole. It is also possible, however, for the elastic deformable parts to have a tapering contour extending from the closing border of said boot to its sole. In this respect the elastic parts above the heel bone region of the boot and above its instep region can have corrugations running parallel to said sole.

The stiff and the elastic parts can be produced by vulcanization or hardening. These parts which may also be partly reinforced with fabric and in the reacted condition have different moduli of elasticity, the parts can be combined in a heated mold.

Another subject of the invention is an instep strap. Generally it is difficult to support a foot with its heel in a shoe, more particularly in a plastic ski boot in a pain-free and firm manner. Instep straps which have been used for this purpose normally run over the instep of the foot and push the foot in a boot downwards to the sole of the boot, that can exert a pinching effect on the vessels of the foot which serve for supplying the foot muscles so that the foot may be subject to pins and needles.

Therefore, one aim of the invention is to ensure that the loading of the foot by an instep strap is less in a vertical direction, while nevertheless maintaining a secure fixation of the foot. The instep strap is for this purpose rigidly and internally affixed on the inner side wall of the upper in the region of the malleolus and naviculare bone of the foot of said side wall, the strap being adjustably attached to the opposite side wall of the upper above the upper ankle joint region on the outside of the pump and said instep strap being sufficiently broad above the ankle joint region so that it covers the upper ankle joint region of the wearer of the boot and overlaps the tibia/fibula of the wearer of the boot by at least 20 mm.

BRIEF DESCRIPTION OF THE DRAWINGS

With reference to the drawings examples of the invention will now be described.

FIG. 1 shows a ski boot diagrammatically from the side. Said boot consists of a sole 21 and an upper 22 connected with it. The upper 22 extends from the sole 21 as far as a closing border 23, whose edge 24 surrounds the lower leg. The latter is not shown. Said upper is divided along the line 25 and provided with closing means 26. The inner part of the sole 21 forms a bed supporting an inserted foot, which is not shown. An instep strap 27 with its ends 28 is fixed rigidly on the interior side wall of the upper 22 on the inner side of this wall of the upper 22 in the region of the malleolus-navicular bone of the foot in said boot. The other end 29 of the instep strap 27 is attached to the opposite side wall outside of this wall of the upper 22 in an adjustable manner. The adjustable end of the strap 27 is fixed above the upper ankle joint region of said boot. At a position adjacent to the instep of the foot in the boot the instep strap is made so broad that it overlaps the lower part of the leg in the boot for at least 20 mm. As a result said instep strap loads the ligaments, vessels and more particularly the instep tendons of the foot in said boot not in a linear manner but over a large area, that is to say it acts as a holding bandage.

In the case of the ski boot shown diagrammatically in FIG. 2 like parts are denoted with like reference numerals. An instep-like strap extension 27a constitutes an extension of said upper 22 in the region of the instep part of the upper 22 and is combined with the instep strap 27.

Figure 1:
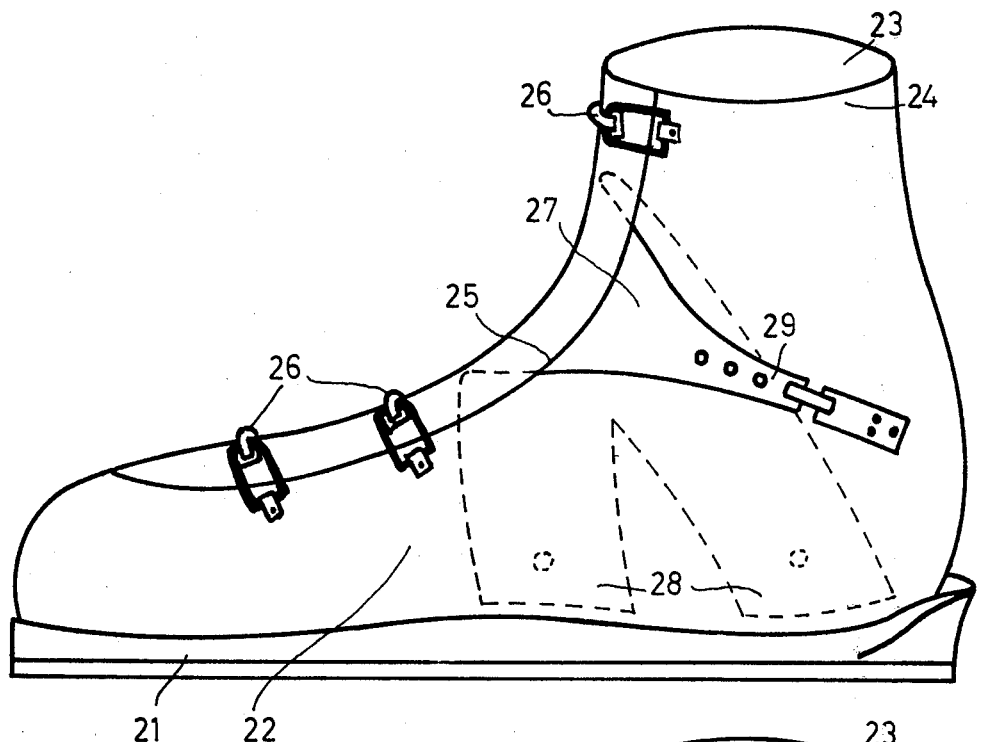
FIGS. 1 and 2 show a ski boot with an instep strap.
Figure 2:
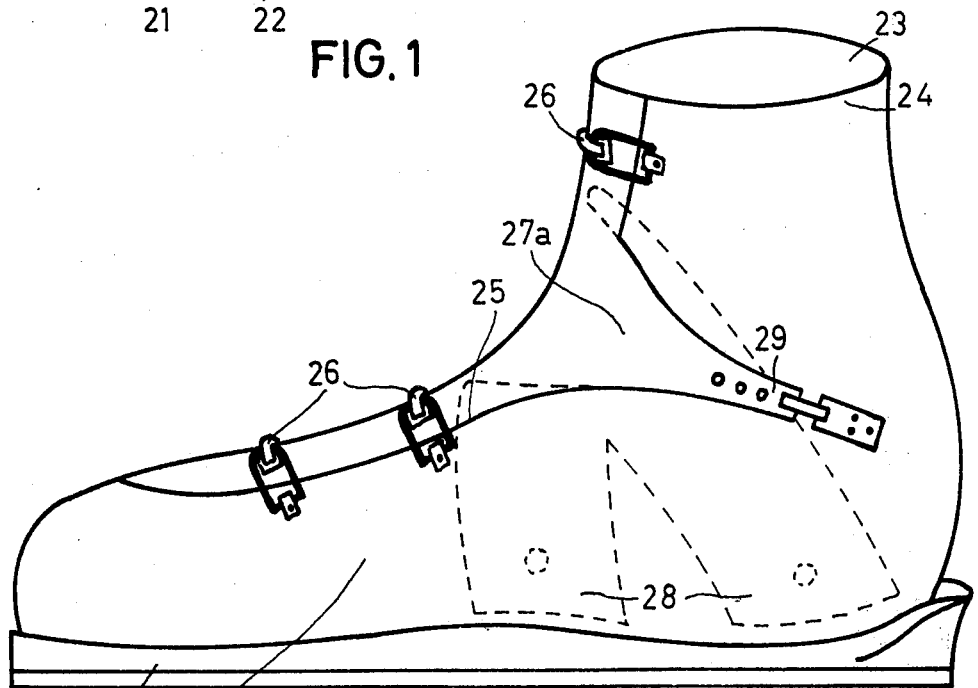
Figure 3:
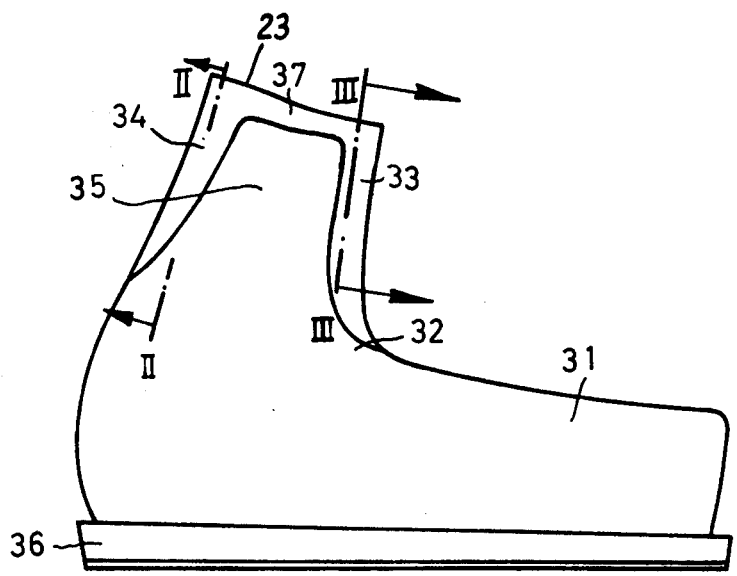
FIG. 3 shows a stiff ski boot with elastically deformable parts.

A ski boot 31 shown in FIG. 3 has above its instep 32 an elastically deformable region 33 and above its heel bone region an elastic region 34 which is provided together with an elastic region 37 which forms the closing border 37 of said boot. The elastic parts of the regions 33, 34, 37 of the stiff upper 35 are fixedly connected to the edges of the stiff upper 35. The material of the stiff upper 35 is of PU or ABS and the elastic parts of the regions 33, 34 and 37 are made of rubber and have a decreasing elasticity from the closing border 37 respectively its uppermost part 23 of the boot 31 towards the boot's sole 36.

Figure 4:
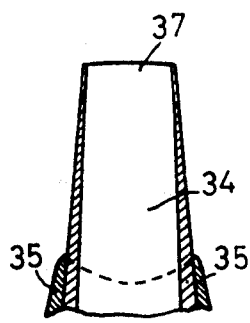
FIGS. 4 to 6 show further constructions of these elastic parts.
Figure 6:
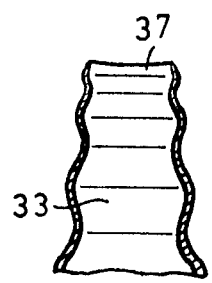

As can be seen from the FIGS. 4 and 6 the wall thickness of the elastic regions 33, 34 decreases from said closing border 37 of the boot 31 towards the boot sole 36.

Figure 5:
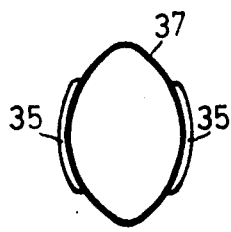

FIG. 5 shows in a cut in a position of II-III of FIG. 3 the stiff parts 35 of the boot 31 in relation to the elastic closing border 37. The latter is fixedly connected at the stiff parts 35.

Figure 7:
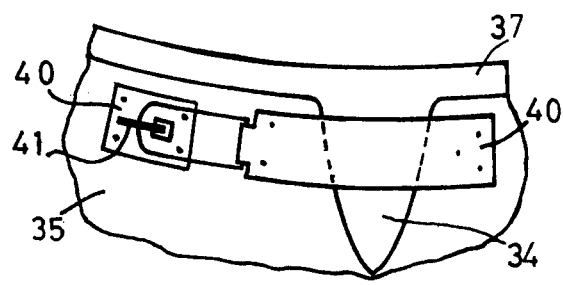
FIG. 7 shows a shoe part with a tension part.

A section of the upper of the boot 31 is shown in FIG. 7. It shows diagrammatically the stiff part of region 35 and the elastic part of region 34 above the heel region of the boot 31. The elastic part 34 is provided with a tension part 40 extending over it from outside of the upper of said boot 31. It limits the movement of the lower leg in the boot 31 to its rear. Such a limitation is desired in many cases, for example in the case of a new swinging movement in skiing.

A substantial inventive principle is based upon the fact that the course of movement in skiing is to be carried out steadily without jerks without abrupt limitation of the lower leg movement. In order to fulfill this requirement the ski boot consists of a stiff shell surrounding the foot with laterally stiff parts and above the ankle region of the boot with elastic regions above the heel and instep region of said boot with a decreasing elasticity of the material of these regions towards the sole of said boot.

An instep strap fixes a heel of the foot in said ski boot without pain and supports the naviculare and caput tali bone of a foot in said boot laterally.

I claim:

1. A plastic ski boot comprising a boot sole, a boot upper connected with said sole, said upper being stiff at least in the region of said sole and its sides and laterally above the ankle bone region of said upper, characterised in that the stiff lateral sides form recesses above the heel at the rearmost part of said upper and the instep region, and in that said upper includes a closing border of elastically deformable material having at least two appendages one of which extends from and closes said recess above the heel bone region of said upper and the second of which extends and closes said recess above the instep region of said upper, said closing border and its appendages being more elastically deformable than the remaining portion of said upper and decreasing in elasticity from the uppermost portion of said closing border in the direction of said sole of said boot, whereby said elastically deformable closing border is fixedly connected at the edge of said stiff upper, whereby every change of position between the foot and the lower leg of the skier required in skiing is possible without said elastically deformable closing border of said upper of said boot losing its snow-tight fit in respect to the leg of the skier positioned in said boot.

2. A plastic ski boot in accordance with claim 1, characterised in that said elastically deformable part of said upper, positioned above the heel bone region of said upper is provided with a tension part extending over it, one end of this tension part being fixed to the stiff part of said upper and its other end being adjustable connected to said stiff part of said upper.

3. A plastic ski boot in accordance with claim 1, characterised in that said appendages are wedge-shaped with the narrowest portion of said wedge-shaped appendages being directed towards said sole and said appendages having a length of at least 40 mm measured in a plane perpendicular to the plane of said sole.

4. A plastic ski boot in accordance with claim 1, characterised in that said elastically deformable parts of said upper have a wall thickness increasing in the direction of said boot sole.

5. A plastic ski boot having a sole and an upper connected to said sole, said upper having substantially two longitudinal side walls, characterised in that the inner side wall is provided with a rigidly affixed instep strap internally in the region of the malleolus and naviculare bone of the wearer of said boot of said side wall, said strap being adjustable attached to the opposite side wall of said upper above the upper ankle joint region on the outside of said upper and said instep strap being sufficiently broad above the ankle joint region, so that it covers the upper ankle joint region of the wearing of the said boot and overlaps the tibia/fibula of said wearer by at least 20 mm.

* * * * *